June 30, 1925.
F. L. TURNMIRE
TIRE CARRIER
Filed March 31, 1924
1,543,808
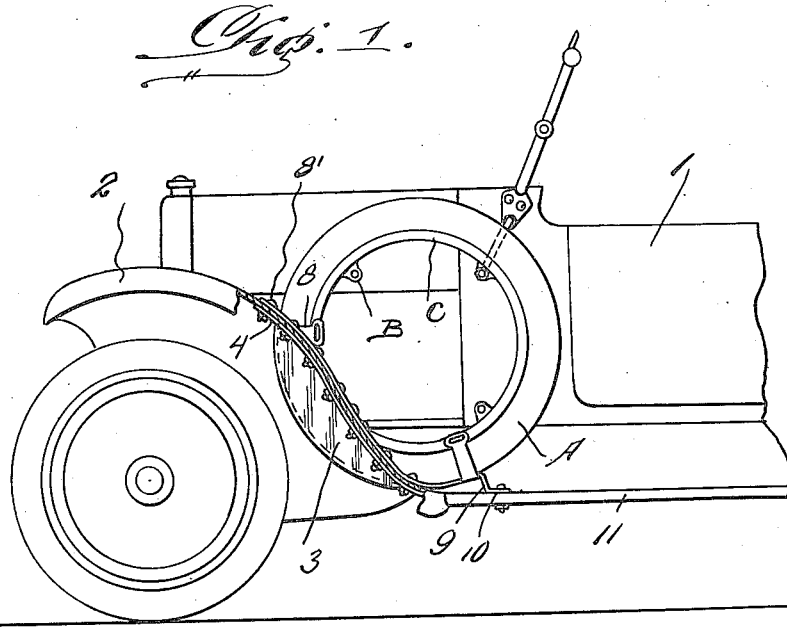
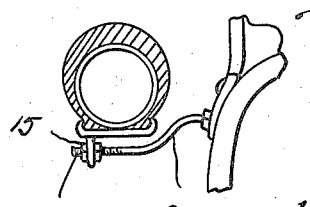
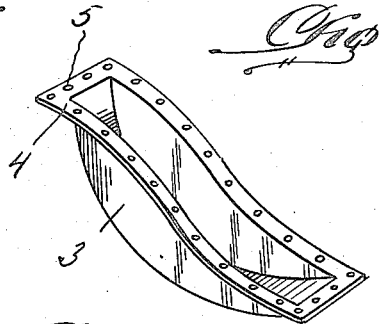
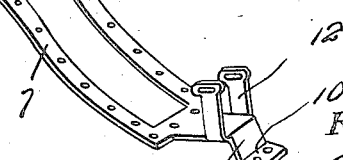
Inventor
Francis Lee Turnmire.
By
Attorney Patented June 30, 1925.

1,543,808

UNITED STATES PATENT OFFICE.

FRANCIS LEE TURNMIRE, OF OAKLAND, CALIFORNIA.

TIRE CARRIER.

Application filed March 31, 1924. Serial No. 703,225.

*To all whom it may concern:*

Be it known that I, FRANCIS LEE TURNMIRE, a citizen of the United States, residing at Oakland, in the county of Alameda and State of California, have invented certain new and useful Improvements in a Tire Carrier, of which the following is a specification.

This invention relates to new and useful improvements in spare tire carriers and has for its principal object to provide means in connection with the fender of an automobile for receiving a portion of the spare tire and supporting the same in position adjacent the hood and body of the car, placing the same in such a position as not to interfere with the access to the vehicle.

A further object of the invention is to provide a tire carrier of the above mentioned character which will obviate the necessity of having to employ the spare tire carriers on the rear of the vehicle thus permitting the space ordinarily occupied by the rear tire carriers to be used for other purposes, such as carrying trunks or the like.

A still further object of the invention is to provide a spare tire carrier of the above mentioned character which includes a tire receiving member supported by the fender, the latter having an opening provided therein whereby a portion of the tire may extend therethrough, and means cooperating with a tire receiving member for securing the same in position on the fender and simultaneously providing a means for holding the tire in position thereon.

A still further object of the invention is to provide a device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of the specification and in which like numerals designate like parts throughout the same, Figure 1 is a fragmentary side elevation of a vehicle showing my invention in position thereon.

Figure 2 is a fragmentary detail view of the securing bracket extending from the side of the body of the vehicle, Figure 3 is a perspective view of the tire receiving member, and Figure 4 is a perspective view of the frame associated with the tire receiving member.

In the drawing wherein for the purpose of illustration is shown a preferred embodiment of my invention, the numeral 1 designates generally an automobile vehicle body of any well known construction and the numeral 2 designates the front fender thereof. For the purposes of carrying out the objects of the present invention, the fender 2 is provided with an enlarged opening which extends longitudinally therethrough and adapted to be secured to the under side of the fender 2 and cooperating with the opening formed therein is the tire receiving member 3. The same has its upper edge provided with a flange 4 in which are formed a plurality of openings 5 and these openings 5 are adapted to cooperate with similar openings provided in the fender and the openings 6 provided in the rectangular frame 7 which is adapted to be positioned on top of the fender 2 and is also mounted in such a position as to communicate with the opening in the fender and the tire receiving member. Suitable fastening means such as is shown at 8' in the drawing is adapted to extend through the registering apertures provided in the securing frame 7, the fender 2 and the flange 4 for holding the parts in proper position on the fender. It is also to be understood that the tire receiving member and the securing frame are of such construction as to conform to the design of the fender so as to fit snugly thereon in the manner clearly shown in Figure 1 of the drawing.

The securing frame 7 is further provided with the upstanding lugs 8 at one end thereof on each side of the frame in the manners clearly shown in Figure 4 while the rear portion of the frame is provided with an extension 9, the outer portion of which is bent downwardly and outwardly to provide an attaching portion 10 for securing the same to the running board 11 of the vehicle. Extending upwardly from the extension 9 are the lugs 12 and the brackets 12 cooperate with the brackets or lugs 8 for engaging and supporting therebetween a portion of the tire A.

For further holding the tire in position on the vehicle after the same has been placed into the member 3, I provide the laterally extending bracket 13 which extends from the body of the car 1 and the outer end of the bracket 13 is provided with a threaded portion 14 which is adapted to extend through the usual lugs B provided on the rim C upon which the tire A is mounted and a suitable nut 15 is threaded on to the threaded end for holding the upper portion of the tire in proper supported position.

With the parts arranged as shown in Figure 1 of the drawing, a spare tire may be readily carried on the forward end of the automobile adjacent the hood and body of the same in such a manner as not to interfere with the access to the seat and will also be supported by the fender against accidental displacement while the vehicle is in operation.

The simplicity with which my device is constructed enables the same to be easily and readily placed in position upon any make of automobile and it is only necessary to cut out a portion of the fender to accommodate the attaching thereto of the tire receiving member 3 and the securing plate 7. A device of this character may furthermore be manufactured at a very low cost and will be strong and durable.

While I have shown a preferred embodiment of my invention, it is to be understood that various changes in the size, shape and arrangement of parts may be resorted to without departing from the spirit of the invention and the scope of the appended claims.

Having thus described the invention, what I claim is:—

In combination with an automobile including the fender thereof, the latter having a longitudinally extending opening provided therein, a tire receiving member disposed on the under side of said fender and communicating with said opening, a frame arranged on the top of said fender extending around said opening, means extending through the frame, the fender and said tire receiving member for securing the same in position thereon, an extension formed on the lower end of said frame and secured to the running board of said automobile, tire receiving brackets extending upwardly from said frame and said extension, and auxiliary means for engagement with the upper portion of a tire for holding the same in position in the tire receiving member.

In testimony whereof I affix my signature.

FRANCIS LEE TURNMIRE.